United States Patent [19]

Christini

[11] Patent Number: 4,711,827

[45] Date of Patent: Dec. 8, 1987

[54] X-RAY INTENSIFYING SCREEN WITH IMPROVED TOPCOAT

[75] Inventor: Theodore P. Christini, Dushore, Pa.

[73] Assignee: E. I. Du Pont De Nemours and Company, Wilmington, Del.

[21] Appl. No.: 833,537

[22] Filed: Feb. 24, 1986

[51] Int. Cl.[4] .......................... G01J 1/58; G03B 11/00

[52] U.S. Cl. .................................. 428/690; 250/483.1

[58] Field of Search ...................... 428/690, 691, 424.7; 250/488.1, 483.1

[56] References Cited

U.S. PATENT DOCUMENTS

| | | | |
|---|---|---|---|
| 2,907,882 | 10/1959 | Patten | 250/80 |
| 3,787,238 | 1/1974 | Juliano | 117/335 R |
| 4,059,768 | 11/1977 | Van Landeghem et al. | 250/483 |
| 4,115,312 | 9/1978 | Engel et al. | 252/301.5 |
| 4,138,361 | 2/1979 | Suys et al. | 252/301.33 |
| 4,205,116 | 5/1980 | Van Landeghem et al. | 428/409 |
| 4,491,620 | 1/1985 | Joiner, Jr. | 428/421 |

OTHER PUBLICATIONS

Dow Chemical Co., "Tyril San Engineering and Fabrication Guidelines", 1985, pp. 1-20 (Form No. 301-66-5-1085).

Dow Chemical Co., "Introducing Tyril 1000 Styrene-Acrylonitrile Copolymer", 1982, (Form No. 301-512-782).

Encyclopedia of Polymer Science and Technology, vol. 1, 1964, pp. 425-435.

*Primary Examiner*—Nancy A. Swisher

[57] ABSTRACT

Performance characteristics for an X-ray intensifying screen are improved by use of an acrylonitrile/styrene copolymer composition as the protective topcoat. The resulting intensifying screen is well suited for use in automatic X-ray changer systems.

10 Claims, No Drawings

X-RAY INTENSIFYING SCREEN WITH IMPROVED TOPCOAT

DESCRIPTION OF THE INVENTION

This invention relates to X-ray intensifying screens. More particularly, this invention relates to X-ray intensifying screens having a protective topcoat that is hard, durable, easy to clean, resistant to static buildup and therefore subsequent discharge to the film, and which will survive multiple film passes through an automatic changer.

BACKGROUND OF THE INVENTION

X-ray intensifying screens are well known in the art and generally comprise, in order, (a) a support, (b) an active layer comprising a fluorescent phosphor dispersed in a suitable binder, and (c) a protective topcoat or abrasion layer coated over the active layer to protect the screen during use. In operation, the intensifying screen absorbs impinging X-rays and emits energy having a wavelength that is readily captured by photographic silver halide X-ray film. A reflective layer, such as $TiO_2$ dispersed in a suitable binder, is typically also present in the intensifying screen, on either side of the support or incorporated directly into the support, to maximize the proportion of energy emitted by the phosphor that will impinge on the X-ray film.

Typical X-ray films are constructed of a substrate (e.g., a polyethylene terephthalate film) that bears gelatino-silver halide emulsion coated on both sides of the substrate. In use, the film is placed in a book-type cassette, with an intensifying screen in intimate contact with both film surfaces. The cassette is placed in proximity with a patient, in the area under examination, and the patient is exposed to X-rays. The film is then removed and processed. Much of the handling is done in the dark to protect the film from undesired exposure. Large hospitals, which handle many X-rays daily, generally use automatic changer and processing devices in which unexposed film is successively fed into position between a pair of X-ray intensifying screens, exposed, and automatically unloaded.

As mentioned above, conventional X-ray intensifying screens have a protective topcoat that is intended to protect the screen, which is relatively expensive, from damage. The ideal topcoat will possess a number of desired properties, including: good adhesion to the phosphor-containing active layer; abrasion and scratch resistance to foreign particles and edges of X-ray film; resistance to cracking/crazing caused by flexing of the screen in use; a low coefficient of friction over the relative humidity range of 10–80%; resistance to degradation (yellowing) that would effect image quality; the ability to withstand damage due to handling abuse; be relatively free of static build-up often caused by sliding contact between the X-ray film and intensifying screen, which can lead to static discharge resulting in blemishes on the X-ray film; and relatively impermeable to fluids normally found in a hospital environment. Durability of the topcoat is especially critical when the intensifying screen is used in an automatic changer, where it is subject to rough treatment.

Conventional topcoat materials, such as cellulose acetate and similar polymers, have not provided desired abrasion and stain resistance, and tend to delaminate from the fluorescent phosphor layer, especially in exacting uses such as in automatic changer systems. Over the years a variety of polymers have been proposed as replacement candidates for cellulose acetate in an effort to provide the balance of desired properties noted above. For example, a fluoroester topcoat was recently proposed in U.S. Pat. No. 4,491,620 of Joiner. While the fluoroester resin provides improved adhesion and stain resistance, it is prone to static build-up and abrasive wear. Thus, the art has continued to seek an improved topcoat for X-ray intensifying screens.

BRIEF SUMMARY OF THE INVENTION

In accordance with this invention, there is provided an X-ray intensifying screen with an improved topcoat that is a copolymer prepared from a mixture of approximately 5 to 50 weight percent acrylonitrile and 95 to 50 weight percent styrene.

DETAILED DESCRIPTION OF THE INVENTION

It has now been found that X-ray intensifying screens having a topcoat that is a copolymer prepared from a mixture of acrylonitrile and styrene provide an exceptional ability to resist abrasion and scratch damage during extended use in automtic changers. The acrylonitrile/styrene copolymer also provides a low propensity for static buildup during handling, thus minimizing occasions of static discharge and resulting blemishes on the X-ray film, excellent stain resistance and adhesion to the fluorescent phosphor layer, and an excellent ability to withstand flexing and handling abuse that such screens may be subjected to. This combination of properties has importance since damage to the intensifying screen can effect quality of X-rays taken with the screen, causing possible repeats in the procedure or potential radiologic misdiagnosis.

Acrylonitrile/styrene copolymers are well known in the art and are commercially available. The copolymer is generally prepared by copolymerizing acrylonitrile and styrene monomers using bulk, solution, bead, or emulsion polymerization techniques. Copolymer resins selected in accordance with this invention will contain sufficient acrylonitrile, generally at least 5% by weight, to offset brittleness of polystyrene which, if used alone, is prone to cracking when the intensifying screen is subjected to flexing stresses. At above 50% acrylonitrile by weight, solubility of the resin in typical coating solvents decreases to the point that coating may become a problem, and/or solvents needed to dissolve the copolymer may damage the fluorescent phosphor. Typical commercial copolymers, containing approximately 20 to 35% acrylonitrile by weight, may be used to advantage. Tyril® acrylonitrile/styrene copolymers sold by the Dow Chemical Company have proven to be particularly useful as a protective topcoat for X-ray intensifying screens.

It has been unexpectedly found that acrylonitrile/styrene copolymers described above not only have an excellent balance of propertiess ideally suited for use as a protective topcoat for X-ray intensifying screens, but the resulting topcoat also has a textured surface that provides attendant benefits. Automatic changers typically have devices that insure good film/screen contact. The textured surface provided by the acrylonitrile/styrene copolymer facilitates the escape of air between the two surfaces as contact is made by the changer. This insures the desired intimate contact between the intensifying screen and X-ray film. This intimate contact insures sharpness of the X-ray image recorded on the film.

Adhesion of the acrylonitrile/styrene copolymer to the fluorescent phosphor may be improved, if desired, by the inclusion of an adhesion promoter in the copolymer. Use of carboxylated acrylic polymers, typically those having a molecular weight in the range of about 7,000 to 260,000 may be selected for this purpose. Carboset ®XL-27 and Carboset ®525, for example, sold by the B. F. Goodrich Company have been found to be particularly useful. Other promoters will be apparent to those skilled in the art. Such adhesion promoters generally will be used in the weight range of 5% to 20% by weight, although smaller or larger quantities may have use for specific applications.

Addition of small quantities of a surfactant, typically in the range of about 0.0001 to 0.1% by weight, has been found useful to modify the textured surface of acrylonitrile/styrene copolymers with or without inclusion of the adhesion promoter. In book-type cassettes designed for hand processing, for example, it is desirable that the protective coating have a smooth surface. This may be achieved by adding 0.05 to 0.1% by weight of silicone oil or a fluorinated alkyl ester surfactant, for example. Thus, the addition or elimination of a minor ingredient permits the acrylonitrile/styrene copolymers to offer the advantage of satisfying the needs of both major applications for X-ray intensifying screens (i.e., providing a textured or smooth surface).

For coating on the fluorescent phosphor layer of the intensifying screen, the acrylonitrile/styrene copolymer is dissolved in a suitable solvent. Conventional solvents such as acetone, methylene chloride, methyl ethyl ketone, and mixtures of these and other solvents are representative solvents that may be used to advantage. Conventional additives, such as particulate material (e.g., hydrated silicas) to assist transport characteristics, may be included in the coating solution in addition to the adhesion promoters and surfactants. Conventional coating techniques and equipment are used for applying the copolymer solution and for drying the solvent.

The acrylonitrile/styrene topcoat may be applied over well-known X-ray luminescent phosphor layers, which typically comprise phosphor particles dispersed in a suitable polymer binder, which in turn is supported on a flexible polymeric substrate, such as polyethylene terephthalate film, all as described in Joiner, U.S. Pat. No. 4,491,620, incorporated herein by reference.

The thickness of the polyethylene terephthalate film support is from about 0.0025 inch (0.0064 cm) to 0.03 inch (0.0762 cm), preferably approximately 0.01 inch (0.0254 cm). Dyes or finely divided pigments, e.g., $TiO_2$, may be coated on or dispersed in the support. A reflective layer may be coated on the support either as a backing layer or interposed between the support and the active (phosphor) layer. The reflective layer, if present, may be coated at a thickness of about 0.0003 inch (0.0007 cm) to about 0.001 inch (0.00254 cm) or more. Preferably the reflective layer is dispersed in a binder such as that described by Brixner, Example 1 of U.S. Pat. No. 3,895,157 which is incorporated herein by reference.

The phosphor containing layer can use any of many known luminescent phosphors or phosphor particles which can be dispersed in any one of a host of polymeric binder systems. Preferred phosphors include $YTaO_4$, $CaWO_4$, LaOBr, $Gd_2SO_4$, among other. The phosphors are traditionally dispersed by milling with a binder, e.g., polyvinyl butyral, or carboxylated acrylic resin, in suitable solvents and are coated on the support by well-known methods to a thickness of 0.004 to 0.014 inch (0.010 to 0.036 cm). The term "phosphor" or "active layer", as used herein, will denote any suitable phosphor that luminesces on exposure to X-rays and is coated in a binder on a support. The luminescence may occur in the portion of the spectrum from 300 to 700 nm depending on which phosphor is used.

The X-ray intensifying screens are suitable for all X-ray radiographic processes. The screens having the flexiblle, film-forming polymer topcoats of this invention are particularly useful in modern rapid changer systems, e.g., Cut Film Changer Type AOT-R, or PUCK, sold by Elema-Schonander, Sweden, and the Buckymat Automatic Film Changer sold by Buckymat, Seimens Corp., Federal Republic of Germany. In these rapid changer systems, or equipment designed to simulate these changers, the protective topcoat coated over a phosphor layer survives well without topcoat failure, is highly resistant to stain; and, in addition, is substantially free from static build-up, e.g., during film transport in an automatic chaner. The X-ray screens can be used over and over again and still retain these advantages.

This invention will now be illustrated, but is not intended to be limited by, the following examples.

EXAMPLE 1

A reflective suspension was made as follows:

| Ingredient | Amount (g) |
|---|---|
| Titanium dioxide | 100 |
| Chlorosulfonated polyethylene | 40 |
| n-butyl acetate | 124 |
| Mixed petroleum naphtha (Initial BP 247° F. (120° C.), API Gr. 59-61 at 60° F. (16° C.), Sp Gr 0.7385 | 84 |
| Dioctyl ester of sodium sulfosuccinic acid | 2 |
| Polymeric organic silicone solution (2% in toluene) | 2 |

The milled suspension was filtered, coated on a 0.010 inch (0.0254 cm) thick biaxially oriented polyethylene terephthalate film sheet to a wet thickness of 0.010 inch (0.0254 cm) and dried. Multiple samples were prepared.

Several phosphor suspensions to be used as the active layer were prepared as follows:

Phosphor Suspension A

A LaOBr phosphor dispersed in polyvinyl butyral was made as described in Example 1 of Joiner, U.S. Pat. No. 4,491,620.

Phosphor Suspension B

Binder Solution (B115)

| Ingredient | Amount (g) |
|---|---|
| n-butyl acetate | 43.13 |
| n-propanol | 34.00 |
| Carboset ® 525(1) | 10.00 |
| Carboset ® 526(2) | 10.00 |
| Polymeric organic silicone fluid | 0.07 |
| Zelec ® 2457E(3) | 0.40 |
| Aerosol ® OT-100(4) | 0.40 |
| Block copolymer of ethylene oxide | 2.00 |

-continued

| Ingredient | Amount (g) |
|---|---|
| and propylene oxide | |

(1)acrylic resin, avg. mol. wt. 260,000, Acid No. 76-85, B. F. Goodrich Co.
(2)acrylic resin, avg. mol. wt. 200,000, Acid No. ca. 100, B. F. Goodrich Co.
(3)anionic antistatic agent of mixed mono- and dialkyl phosphates of the general structure $RH_2PO_4$ and $R_2HPO_4$ where R is $C_8$ to $C_{10}$ alkyl, E. I. du Pont de Nemours and Company, Wilmington, Delaware.
(4)Dioctylester of sodium sulfosuccinic acid.

Phosphor Suspension

| Ingredient | Amount (g) |
|---|---|
| $YTaO_4$: 0.02 Nb | 769 |
| B115 binder solution | 231 |

The following topcoat solutions were then prepared:

| Ingredient | Amount (g) |
|---|---|
| 1. Control - prior art: | |
| Copolymer of a fluoroester(1) (80 parts) and methylmethacrylate (20 parts) made according to the teaching of Example 1, U.S. Pat. No. 3,950,315 | 400.0 |
| Freon ® TA-fluorocarbon solvent (E. I. du Pont de Nemours and Company) | 5000.0 |
| Zelec ® 2457E(2) | 4.76 |
| 2. Of This Invention: | |
| Polystyrene-acrylonitrile copolymer (Tyril ® 1000, Dow Chemical Co.) | 16 (visc. = 8 cps) |
| Silicone Oil (polymeric organic silicone solution, 1% in acetone) | 0.16 |
| Acetone | 184 |
| 3. Of This Invention: | |
| Polystyrene-acrylonitrile copolymer (Tyril ® 1000, Dow Chemical Co.) | 20 (visc. = 8–10 cps |
| Silicone Oil (polymeric organic silicone solution, 1% in acetone) | 0.2 |
| Acetone | 180 |
| 4. Of This Invention: | |
| Polystyrene-acrylonitrile copolymer (Tyril ® 1000, Dow Chemical Co.) | 40 (visc. = 55 cps) |
| Silicone Oil (polymeric organic silicone solution, 1% in acetone) | 0.4 |
| Acetone | 160 |

(1)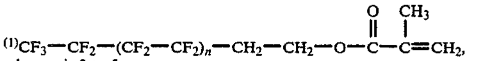
where n is 3 to 5.
(2)anionic antistatic agent of mixed mono- and dialkyl phosphates of the general structure $RH_2PO_4$ and $R_2HPO_4$, where R is $C_8$ to $C_{10}$ alkyl, E. I. duPont de Nemours and Company, Wilmington, DE.

5. Of Prior Art:

In addition, a standard cellulose acetate topcoat solution (see Joiner, U.S. Pat. No. 4,491,602, Example 1) was also prepared and labelled at 5.

Each of these topcoats were coated over samples of X-ray screen elements already containing the support, the reflective layer and the active layer to form the topcoat layer and each sample then dried. In each case, the topcoat layer had a dried thickness of about 0.3 mil. Each sample was then tested for adhesion, stain resistance, static resistance and resistance to abrasion wear.

In the case of elements containing topcoats 2, 3 and 4 (of this invention) all were found to have good adhesion, superior stain resistance, a low propensity to develop static and survived well in wear tests. Elements containing the fluoroacrylate topcoat show a high propensity to develop static and reduced wear characteristic. Elements containing the cellulose acetate topcoat show stain and low adhesion.

EXAMPLE 2

In a manner similar to Example 1, an X-ray screen was fashioned using a LaOBr phosphor in the active layer and a topcoat comprising a mixture of Tyril 1000 polystyrene-acrylonitrile copolymer and acrylate resin 90:10 respectively. This material was prepared as follows:

| Ingredient | Amount (g) |
|---|---|
| Polystyrene-acrylonitrile copolymer | 36 |
| Acrylate Resin (Carboset ® XL-27, MW 30,000, B. F. Goodrich Co.) | 4 |
| Acetone | 160 |

and coated over the active layer to a coating thickness of 0.3 mil. The dried screen was tested in a manner similar to Example 1 and exhibited superior results when compared to controls regarding stain, static and abrasion. Additionally, a further increase in adhesion was noted over the pure polystyrene-acrylonitrile copolymer alone. Since no coating aid was added to this example, the surface was textured and was eminently suitable for use in the automatic changer.

EXAMPLE 3

Samples of screens prepared as described in Examples 1 and 2 were used in this example along with an additional control of a topcoat prepared from a 10% polystryene in methylene chloride. These screens were then mounted in a Schonander AOT-S rapid film changer along with a supply of conventional X-ray film. Films were passed through this device until failure occurred as noted by either Film Overlap (e.g., films being caught partially one on top of the other and caused by a failure of film to exit from the screen set) or by Emulsion Build-up (e.g., emulsion from the X-ray film being deposited on the screen due to high tack or screen scratching, both of which result in unacceptable film images).

Samples were taken after the passage of 500 film samples to evaluate screen performance with the following results:

| Topcoat | No. Films Used | Remarks |
|---|---|---|
| Cellulose Acetate | 500 | Film Overlap |
| Polystyrene | 500 | Emulsion Build-up |
| Fluoroacrylate | 2500 | Film Overlap |
| Polystyrene-acrylonitrile/-acrylate (Ex. 2) | >5500 | No problems |

EXAMPLE 4

A phosphor suspension was prepared as follows:

| Ingredient | Amount (g) |
|---|---|
| LaOBr: .002 Tm | 1000.0 |
| Binder Solution B115 from Example 1 | 474.0 |
| Ureaformaldeyde Resin (Uformite F-240) | 9.4 |

This suspension was milled as previously described and coated on a suitable support containing the reflective layer, also as previously described. Two samples of phosphor coating were made and dried. The topcoat solutions from Example 1 were prepared with and without the polymeric organic silicone solution and were coated over the above-referenced phosphor layers to yield structures similar to that previously described. After drying, each screen was tested for adhesion, stain and static resistance, resistance to abrasion wear, etc. In both cases, the screens showed excellent qualities and both functioned well with X-ray film exposure (i.e., good sensitometric properties). However, the screen made with the topcoat having no silicone fluid present in said topcoat, had a dimpled or "orange peel" texture (i.e., a textured surface). This orange peel texture permits good film/screen contact in automatic changers when the device used is pressed together to achieve said contact because the trapped air can escape via the channels formed by this textured surface. Additionally, when the pressure is released, air can now quickly enter via through these channels permitting film/screen separation and easy transport of the film from this pressure device. This prevents film overlaps and jam-ups. On the other hand, the screens made with the dispersing agent in the overcoat had a smooth, shiny surface. This screen was particularly useful in book cassettes where more time is available to bleed out the air to insure good film/screen contact.

In addition screens having the topcoats of this invention were exposed in an X-ray exposure test utilizing conventional X-ray film. In each case speed, sharpness and total noise were equivalent to controls.

It is contemplated that other components and ingredients may be added to the protective topcoat without adversely effecting performance thereof.

What is claimed is:

1. In an X-ray image intensifying screen comprising a support, an active layer containing fluorescent phosphor particles dispersed in a binder, and a protective topcoat covering said active layer, the improvement wherein said protective topcoat is a copolymer prepared from a mixture of approximately 5 to 50 weight percent acrylonitrile and 95 to 50 weight percent styrene.

2. The intensifying screen of claim 1, wherein the protective topcoat contains an adhesion improving component.

3. The intensifying screen of claim 2, wherein a carboxylated acrylic polymer is the adhesion improving component.

4. The intensifying screen of claim 1, wherein the protective topcoat contains a surfactant.

5. The intensifying screen of claim 4, wherein the surfactant is a silicone oil.

6. The intensifying screen of claim 5, wherein the surfactant is a fluorinated alkyl ester surfactant.

7. The intensifying screen of claim 1, wherein the copolymer is prepared from a mixture of approximately 20 to 30 weight percent acrylonitrile and 80 to 70 weight percent styrene.

8. The intensifying screen of claim 7, wherein the protective topcoat contains an adhesion improving component.

9. The intensifying screen of claim 8, wherein a carboxylated acrylic polymer is the adhesion improving component.

10. The intensifying screen of claim 7, wherein the protective topcoat contains a surfactant.

* * * * *